United States Patent [19]

Eggen et al.

[11] Patent Number: 5,774,314
[45] Date of Patent: Jun. 30, 1998

[54] MEDIUM PLAYER WITH TIME-WISE BAR DISPLAY OF ITEMS

[75] Inventors: Josephus H. Eggen; Joanne H. D. M. Westerink; Reinder Haakma, all of Eindhoven, Netherlands

[73] Assignee: U.S. Philips Corporation, New York, N.Y.

[21] Appl. No.: 949,290

[22] Filed: Sep. 22, 1992

[30] Foreign Application Priority Data

Oct. 2, 1991 [EP] European Pat. Off. ............ 91202565

[51] Int. Cl.⁶ ............................ G11B 27/19; G11B 27/34
[52] U.S. Cl. ............................................ 360/137; 369/34
[58] Field of Search ........................ 360/137, 32, 98.04, 360/98.05; 369/33, 34, 58

[56] References Cited

U.S. PATENT DOCUMENTS

| 4,833,549 | 5/1989 | Yoshimito et al. ................. 360/32 |
| 4,959,735 | 9/1990 | Kawai ................................... 360/137 |
| 5,010,437 | 4/1991 | Utsugi et al. ....................... 360/137 |

FOREIGN PATENT DOCUMENTS

| 0275199 | 7/1988 | European Pat. Off. . |
| 0306909 | 3/1989 | European Pat. Off. . |
| 912025640 | 10/1991 | European Pat. Off. . |

Primary Examiner—Stuart S. Levy
Assistant Examiner—David L. Ometz
Attorney, Agent, or Firm—Edward W. Goodman

[57] ABSTRACT

In a consumer player or recorder operating with a linear medium such as a tape or disc there is a time analog display of a representation of various identifiable discrete information items such as sector, record, track. The display is length-proportional and for each item may signal an activity level, an activity state, or a past/future state with respect to a pick-up element position.

15 Claims, 7 Drawing Sheets

MEDIUM PLAYER WITH TIME-WISE BAR DISPLAY OF ITEMS

BACKGROUND OF THE INVENTION

1. Field of the Invention

The invention relates to a consumer apparatus for reading a linear information-carrying medium and reproducing said information, said apparatus having first visual display means for indicating respective activity levels of said information along the medium.

2. Description of the Related Art

A visual display of the activity levels of the medium information has been disclosed in EP-A-306 909, corresponding to U.S. Pat. No. 5,008,875, and referral therein to EP-A-275 199 corresponding to U.S. Pat. No. 4,991,159. The temporal granularity of the display is about ½ minute in the younger reference as compared with 5 minutes in the older reference. The latter reference has three levels of display, one indicating the intended recording time, a second one indicating time not used, and a third one indicating that an attempt is being made to record on an unavailable position. The present invention realizes that the non-expert user would benefit from a display on the basis of the organization of the recorded information viz á viz the user, in addition to the showing of timing positions only.

SUMMARY TO THE INVENTION

Accordingly, among other things, it is an object of the present invention to assist the user by displaying such temporal organization, which, according to a first aspect, is realized in that said display means allow for discretized bar-wise and length-proportional display of a representation of each of a set of identifiable discrete information items of at least a particular minimum length each. An identifiable information item is one that is in some way separate from others, such as by having a name, or other properties that would set it apart as a record. In music, this could be songs, pieces, etcetera. The identification can be attached to the item itself, or it may be stored separately, such as in a table of content (TOC), that would know the lengths of the various items, and possibly, other data thereon, such as name, composer, performer, or other. The discrete display of the items would give additional information to a user, such as realizable by counting of the items, or by recognizing an item through its length, or associating a particular item with another recognizable item. Preferably, the bars referring to the respective items constitute a strip-wise display. The bars may be separated by nominal dark spaces if successive items directly follow each other, or by larger dark spaces where a substantial medium interval is empty or not used. Other representations could be side markers at the item boundaries, or bars that have their length-proportion extending perpendicular to the sequence coordinate. Such a display could thus look somewhat as a histogram. In particular, the display is inexpensive, takes little space, and has been found to be a perceptively advantageous tool for the user.

Now, the invention has been conceived for a consumer tape recorder wherein digitized sound has been prerecorded in combination with digital table-of-content (TOC) information that is distributively stored, so that a relatively small fraction of tape length contains all TOC information. Another way of TOC storage could be on a separately accessible medium on the cartridge (optical or as an integrated circuit). In case of user-recorded tape, the player itself could know the table of contents in its on-board memory. The consumer aspect of the apparatus in particular refers to the category of rather inexperienced users, more so, than to the performance level of the apparatus itself. Now, in the referred tape recorder, the items are called tracks that have a variable length. Minimum length is determined by the recording format that contains a frame-based modulation and error correction organization. Anyway, the minimum length is much larger than one audio sample. Also, other applications would be useful, such as

- compact disc read-only, wherein TOC data may be present in a single track and access delay thereto would be negligible;
- recordable and/or erasable media if some higher-level provision is taken for updating the table of contents upon modification of actually stored information; in particular, compact disc is considered a prospective target;
- video recording/video storage, for which, in principle, similar arguments would apply as regards to audio;
- non-consumer recording such as for clinical, forensic, economical and agogical applications. The term consumer indicates that intended user knowhow would only need to be minimal.

Generally, the term —linear— indicates that there exists a —natural— sequence among the stored information, which sequence is followed in a default situation. Random accessibility to some degree may be overlayed thereon.

In principal, there may be four different user access functions to such recorder:

a) play, wherein the information recorded is reproduced in course with linear time and as available or accessible to the listener/viewer in question;

b) program, wherein such availability or accessibility may be altered, for example by:
   suppressing particular items, titles or tracks;
   protecting particular items, such as by password;
   prescribing start/end, repeat, etcetera of items;
   prescribing particular play sequences (track program);

c) record, wherein new information is stored on the medium as selectable according to prescribed critera, such as by an overwrite permission defined according to a particular beginning point and/or end point defined with respect to the respective track boundaries and/or time interval lengths relative to track beginning or end. Also, particular information may be tagged on an item by selecting on the latter's name or other indicatory information thereof;

d) edit, wherein an item may be renamed, erased or removed, moved to another physical position, be split, wherein two contiguous items may be organizationally connected, or wherein other higher-level function may be executed.

Advantageously, said display means allow for displaying discriminatory information between at least a first user functionality state and a second user functionality state on the level of a complete information item. Such functionality could be accessibility versus non-accessibility, present versus removed, text versus music, past versus future, etcetera. Especially in the latter case the discrimination can be written as a single information item. In most cases, the discrimination is on the level of a complete information item.

Advantageously, said display means allow for perceptually steady displaying of discriminatory information regarding said item's user functionality state. The steady display is perceptually advantageous in respect to the blinking of the reference citation. Perceptually steady means that such changes as may occur are not seen, such as powering intermittently at a flicker-free frequency.

Advantageously, an actual pick-up position along said medium controls a change-over between a "past" state and a "future" state displayed by said display means. This clearly shows where the apparatus is playing, recording, etcetera. Alternatively it can be an intended cursor position, thereby showing the imminent termination point of a transient state. A further advantageous feature is wherein the display means allow for discriminatorily displaying, at a notional and functionality assisting pick-up element's position, an associated information item as differing from neighboring ones of said information items. Especially in the editing mode, it is advantageous to more specifically direct the user's attention to a particular information item that is the object of such editing, such as, for example, renaming or removing. Actually moving the pick-up element often is not necessary.

Advantageously, said display means allow for supplementing said length-proportional display alongside and temporally conforming to a second length-proportional display indicating an intended recording functionality. The simultaneous display of two bar-type displays for a present situation versus a situation after recording will assist the user in determining a sensible policy.

Preferably, any of said displays may be monochromic. It has been found that a display of white, green or blue in various levels of brightness and/or saturation would give a quiet representation. Alternatively, various colors could be combined, for example, to signal an exception or forbidden situation in a different color, such as red or yellow. Alternatively, blinking could be introduced for the latter case.

According to a particularly advantageous aspect, said apparatus has second display means for, in each of a plurality of apparatus modes, displaying a plurality of function assisting indications in the way of a form showing messages as being co-controlled with said first display means with respect to respective item functionality states and/or positions along said medium. Whereas the first display is particularly instructive as regards time-sequential aspects of the apparatus, the second display may indicate what is effectively to be done or being done. The function assisting indications are controlled to be selectively adjusted by the user as will be described hereinafter, and also in co-pending application EP 91202564.0 corresponding to co-pending U.S. patent application Ser. No. 949,283, filed Sep. 22, 1992 (PHN 13.840) herein incorporated by reference. The form-category of display is specifically distinct from the menu display which allows the user to see, in parallel, all possibilities to be selected presently, while the choice offered earlier in a menued tree is largely obscured. Also, the present display does not relate to indicator lamps and other signalizations that just show the presently executed function instead of specifying functionality of selectable future operation.

BRIEF DESCRIPTION OF THE FIGURES

The invention will be explained more in detail with respect to the preferred but non-limitative embodiment, and in particular with respect to appended Figures. Therein.

DESCRIPTION OF A PREFERRED EMBODIMENT

Figure 1:
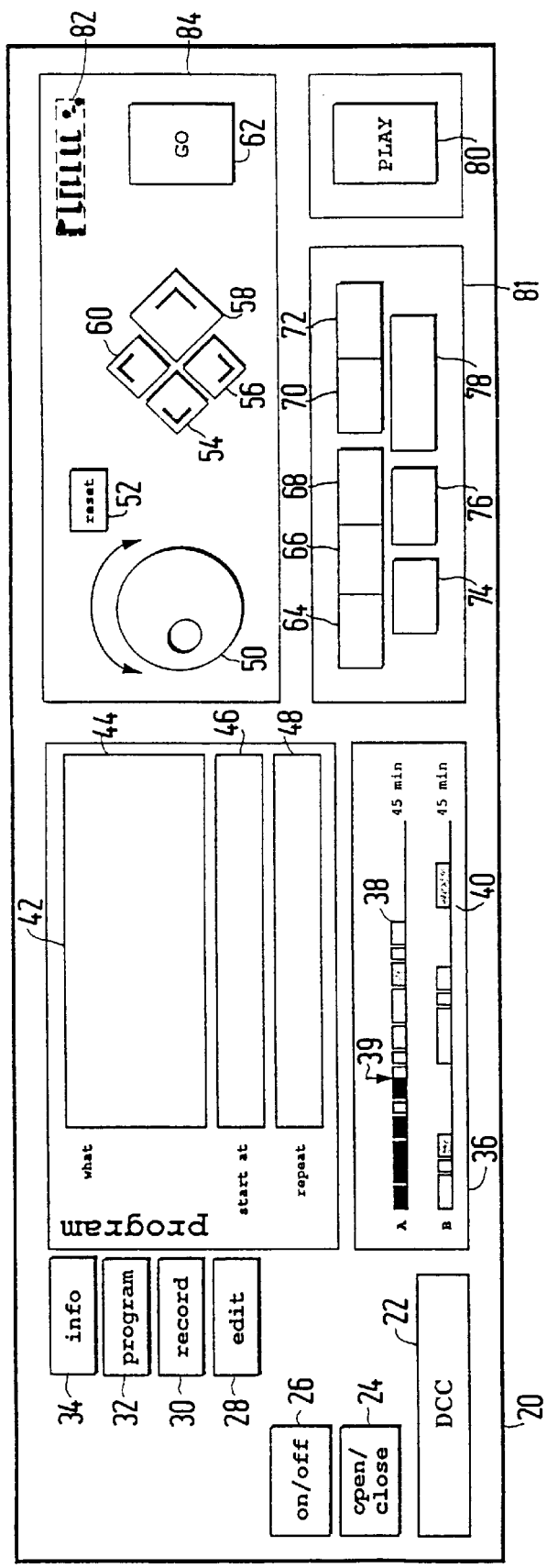
FIG. 1 is an exemplary front plate layout.

FIG. 1 is a front plate 20 layout, shown in program mode layout, of a digital cassette audio tape recorder. Block 22 is the lid of the tape tray, button 24 controls the open/close of this lid with automatic ejection, button 26 controls the on/off of the whole apparatus. Button 28 starts an edit mode. Button 30 starts a record mode. Button 32 starts a program mode. Button 34 starts an information mode. Block 36 has the two length-proportional bar displays that allow, for each of a set of identifiable discrete information items of at least a particular minimum length, a steady indication of either a deactivated condition (here grey), a past condition (black/dark grey) or a future condition (white). Any other combination of grey levels, colors, hatchings, blinking, etcetera, would be feasible as well. In the example, the minimum physical length of a block would correspond to about ½ minute of tape, but this is due to the pixeled granularity of the display. If it is necessary to indicate still shorter items, various solutions would offer themselves in the environment of the invention. First, a single short item wedged between two relatively long ones could be —artificially— lengthened somewhat to the detriment of one or both of its longer neighbors. Second, a separate indication, such as another color or greyness level could indicate —one or more very short items—. Third, such very short items could be suppressed. Various other solutions would be feasible as well. The display can be scaled up or down for various reasons. First, it could be scaled automatically. Depending on the playing time of the medium, the scale can be always adjusted in such a way that the actual display would substantially fill all of the available space in block 36. In another realization (not shown), the scaling would be manually controlled, possibly in such a way that the cursor would remain in the center of the display. Especially in this situation, items that are long enough could have some simple identifier displayed within, such as a sequence number corresponding to the numbering that will be described hereinafter. The effective display of the short items, supra, could then be automatically updated in line with effective scale. Now, the displays for side A and side B are separate as shown. Physically, the tape has two separate recordings, side by side, both of 45 minutes length. Side B has empty spaces, which differs from a deactivated (—light grey) condition, in that usually, deactivation can be reversed by different programming. Each block is called a track. Blocks have unlimited maximum length, as far as physically possible. Solid arrow 39 indicates actual position of pick-up element/recording head. Inasmuch as the two sides of the tape are physically alongside, switch-over of the pick-up element between the two sides can be done quasi-instantaneously. Physically, the display can be liquid crystal, LED, CRT, electrochromic, or other. Block 42 shows proposed control actions in the program mode that will be detailed hereinafter, and contains subblocks 44, 46, 48. The various display elements in block 42 may or may not be in the same technology as block 36. Block 84 houses various special controls. Rotary button or joggle 50 for an activated block (44, 46, 48) cycles all associated proposals through the display format. It has reset button 52 for returning to a default state. Buttons 54, 56, 58, 60 are a four-way cursor mover. Button 56 moves the cursor downward, button 58 moves the cursor to the right, button 60 moves the cursor upward, and button 54 moves the cursor to the left. These buttons select the active proposal in block 42, in a way that will be described in detail hereinafter. Button 58 is one size larger than button 54, 56 and 60. Another solution is having it the same size as, but a different color from the other three buttons. Cursor 39 is not moved, because this represents actual physical position of the pick-up element. Button 62 activates leaving the control protocol for action. Word 82 is a manufacturer's trademark. The other buttons are conventional control buttons for an audio tape recorder and will not be discussed for brevity. Although not extensively disclosed herein, the invention would be just as feasible with remote control, speech-controlled apparatus, or other user-activity signalization.

Figure 2:
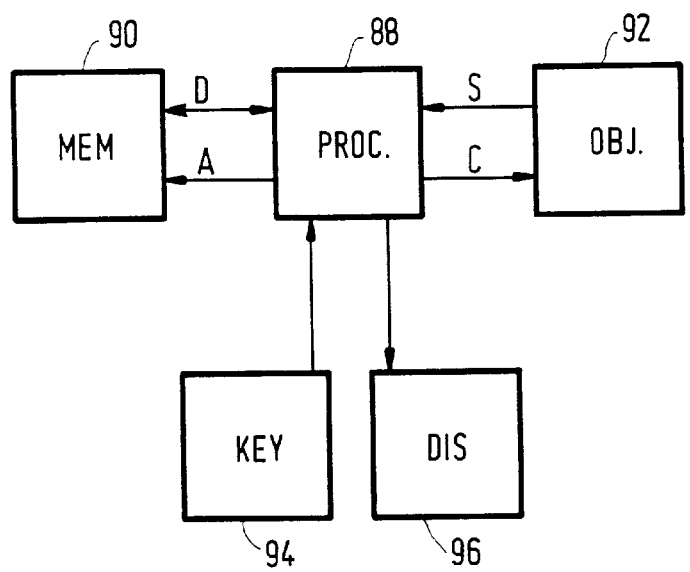
FIG. 2 is a block diagram of the apparatus.

FIG. 2 is a block diagram of an apparatus according to the invention. The apparatus' object (disc, tape or other) 92 gets control signals C and produces sensor signals S. The latter may be data from a TOC and/or other identifiers, and also the signals that a user could intend to utilize and which, in principle, would be digital as well. However, there is no á priori bar against analog signals. Furthermore, signals S could be physical sensor data such as object (disc, tape or other) present/absent, spin up/spin down, forward/reverse, correct/unallowable command, and various others. Block 94 is a set of user activatable keys. Block 96 is a user display that displays part of FIG. 1. The keys and the display may be joined in the way of a soft keyboard. The keys and the display have been treated supra. Block 90 represents a memory. For one, it operates as actual memory, for example, in that it stores the table of contents (TOC) of the object as soon as possible upon presentation of the object to the apparatus in question, so that the table of contents could be read therefrom. This reading can be activated automatically if this table of content is stored at default location (first revolution track of a compact disc) or is distributively readable, so that only a small stretch of the (tape) medium needs to pass the pick-up element. In another organization, a specific command could be necessary for reading the table of contents. Furthermore, the memory may store permanently general purpose information or such information that had been presented by the user. After the relevant information had been stored, or for non-object related information, already from the beginning, such information can be addressed by signals A, and thereupon be provided as data D to processor 88. Processor 88 interfaces to all other subsystems mentioned. By itself, the processor functions are straightforward, only the interaction with display/keyboard lending any specific performance thereto. Timing, flowcharting, and policy would be clear from the descriptions of the various display formats hereinafter.

THE DISPLAY FORMATS

Hereinafter, a set of display formats is discussed, that are organized according to four different families. Each respective family is activated by its own selection button 28–34 in FIG. 1. In addition, the PLAY button 80 controls standard play modes. In addition to the discussion of the display, also the activation within each family with respect to buttons 50–62 will be discussed. Generally, the display pages according to the invention do not show a menu, from which a future choice may be made, because this has been found confusing for an unskilled user. In contradistinction, as far as executable operations concerns, the display formats for any partial function show a formalized proposal. Any such proposal can be fixed as it is shown. Such fixation for the aggregate of actual proposals shown is activated by fixating button 62. The above means that effectively the display shows a wholly or partially filled in form, showing all entries that have been made in the past (actually or by default) and also, where an entry may be modified: the highlighting can be an increased luminosity of the block edge or of its text, blinking, a specific indication such as an index finger, colored asterisk, and other.

Figure 3:
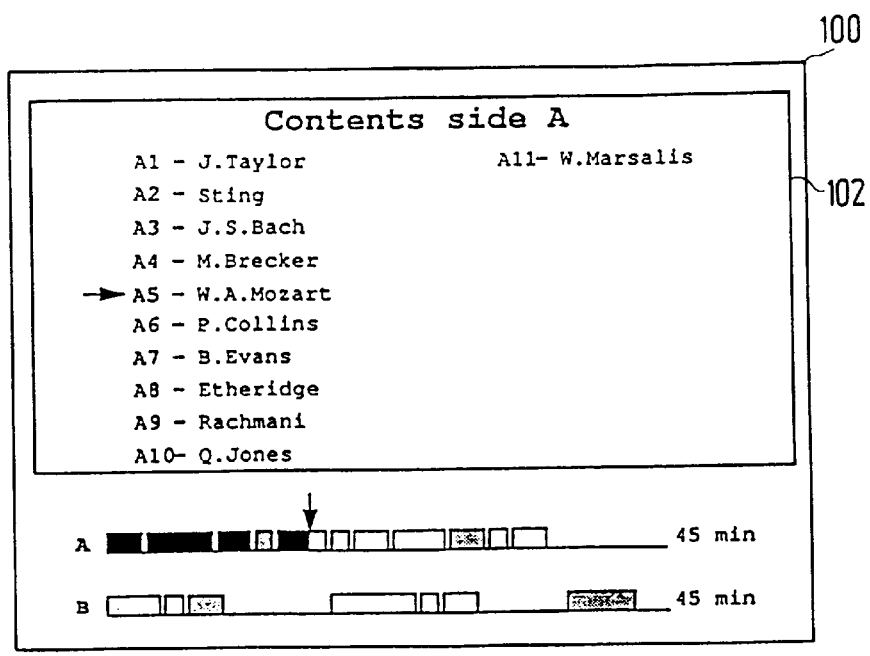
FIG. 3 is an INFORMATION layout.

Now, FIG. 3 is an INFORMATION layout. It shows contents of side A as read from TOC, and moreover, the actual pick-up element position, both on the time bar display and on the list of contents, each time in the form of a black arrow. In contradistinction to the earlier convention, black is past, white is future, grey is deactivated, "no block" shown means empty or erased. The time length-proportional display also shows normal playing time of each side. Block 100 is the display perimeter, block 102 is the specific display of this format. Pressing reset button 52 will show the display of side A. Rotating rotary button 50 of FIG. 1 will present other displays. Rotating the button 50 one position clockwise will show the same content display for side B. One further clockwise rotated position will show the actual track as selected by the position of the pick-up element, to wit: number and label (or name), length of the actual track and time instant within the playing interval of the actual track. One further clockwise rotated position will show the actual track as selected by the actual position of cursor element, to wit: number and label, and furthermore a part of the song lyrics in the neighborhood of the pick-up element's position. In practice, these the lyrics of the next 30 seconds or so interval. Note that activating the Info button 34 does not interfere with the playing operation of the tape recorder. During INFORMATION display, buttons 54–62 are deactivated.

Figure 4:
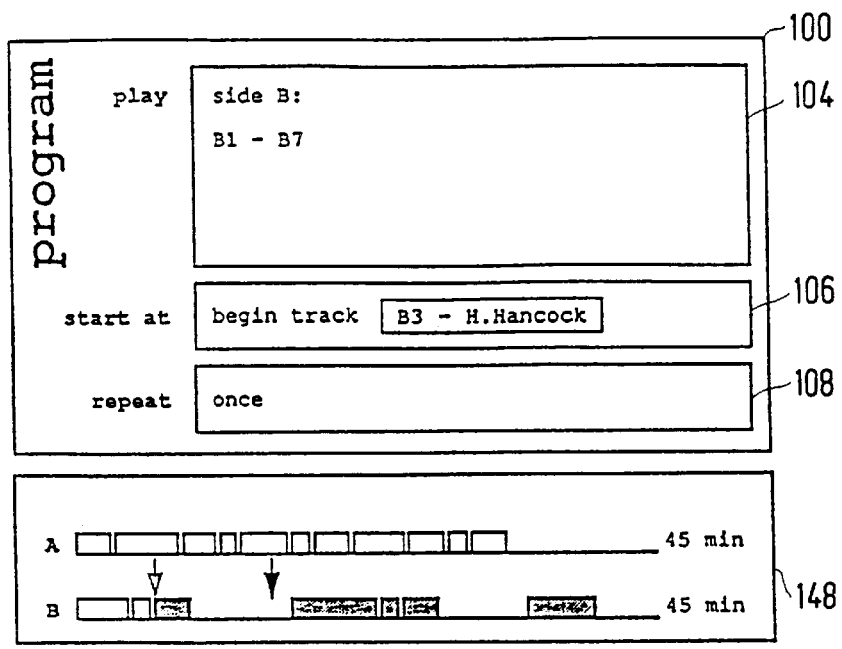
FIGS. 4, 5, 6 are PROGRAM layouts.
Figure 5:
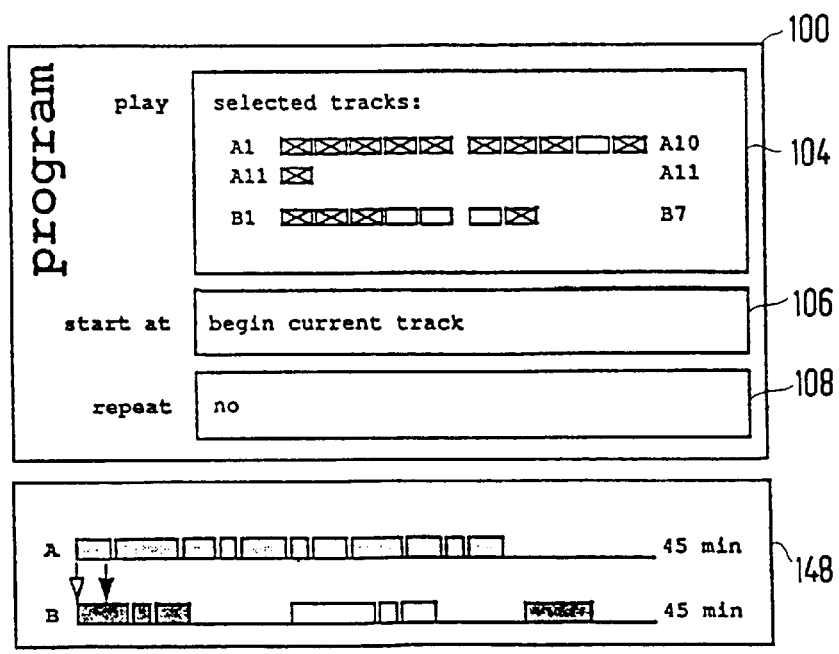

FIGS. 4, 5 are PROGRAM layouts that are activatable by the button PLAY, or generally, by any button in block 81, because actuation of such a button could influence the actual reproduction operation. In certain circumstances in the RECORD situation, for reasons of safety, some more specific operation is necessary to reach a play situation, which, however is a standard feature of players that have a recording capability, and, moreover, it is not related per se to the present invention. PROGRAM has three subblocks 104–108. Pressing "PROGRAM" 32 will always highlight the first block 104, highlighting per se not being shown in the Figure. Pressing cursor button 56 will step highlighting to the next lower block, until block 108 is reached. Pressing cursor button 60 will step highlighting to the next higher block, until block 104 is reached. Alternatively, the blocks step highlighting could form a cyclical chain.

Now pressing reset 52 produces the default content for the highlighted block. Rotating rotary button 50 cycles the content displayed along a sequence of items predetermined for the highlighted block. For block 104, these items are for example:

Default: first side A, then side B
other proposals: first side B, then side A
only side A
only side B (this one shown)

Pressing cursor button 58 will actuate the next lower level for the highlighted block, if existing. The operation of cursor buttons 56, 60 only depends on what is actually displayed, irrespective of what level is actually displayed in the relevant block. The transition to the next lower level is only relevant if cursoring within the actually highlighted block is impossible. In the same way, pressing cursor buttons 54, 56, 58 will activate the next higher level for the highlighted block if cursoring within the highlighted block is impossible. Change-of-level within a particular block does not influence what is displayed in any other block.

With respect to the PROGRAM mode, FIG. 4 shows the highest level for blocks 104, 108. FIG. 5 shows the highest level for blocks 106, 108. The next lower level is shown for block 104 in FIG. 5. This displays all separate tracks of the originating display (=first side A, then side B) as respective blocks of standard size. Therefore, this distinguishes from the length-proportional bar display. Moreover, the display distinguishes between tracks that have been selected for playing —shown with a cross—, and non-selected tracks. If the originating block had been block 104 as shown in FIG. 4, the next lower level would have featured only tracks B1 through B7. Within FIG. 5, one track is highlighted. Upon entering, this is always the first track of those shown, irrespective of whether it had been selected or not. By means of cursor buttons 54, 58, the highlighting can be driven through each row of tracks as shown. By means of cursor buttons 56, 60, the highlighting can be stepped to the next row. If no track is present in the corresponding position, the system chooses the closest track in that row. The originating position may be remembered, or not. So, changing from A5 to the next lower row highlights A11. One further row may either highlight B1 or B5. Changing the selection for any highlighted track is done by operating button 50.

With respect to block 106, FIG. 4 shows not the highest, but the second level. Now, there is one smaller block that is highlighted, showing that the play must start at that track which is displayed. Cycling through the tracks is done by rotary button 50, because the highlighting (the subblock within block 106) remains the same. Cycling is through all tracks displayed in block 104, whether according to the showing in FIG. 4, or to the corresponding showing in FIG. 5. Returning to the next higher level is effected by actuating cursor button 54 upon reaching the first displayable track, in this example B1.

In the PROGRAM mode, blocks 104, 106 have two levels, block 108 has only one level. Of course, the number of levels could be different, according to needs and intended user interest.

On the highest level, rotary button 50 may cycle the contents through the various blocks, for example, as follows:

block 106: default is begin side A
  next:
    begin side B
    begin current side
    begin current track
    at current position
    begin specified track (=shown in FIG. 4)
block 108: default is: no
  cycling:
    once
    twice
    continually.

In another realization, the length-proportional display had been suppressed only for the program mode, in favor of another formalized proposal that would specify the pause between successive tracks. Default value would have been zero, whereas the various possibilities could be geometrically (1, 2, 4, 8, . . .) or linearly (1, 2, 3, 4, . . .) increasing. If during play, moving along unselected tracks would take longer than the specified pause, the actually attainable value would be taken.

Figure 6:
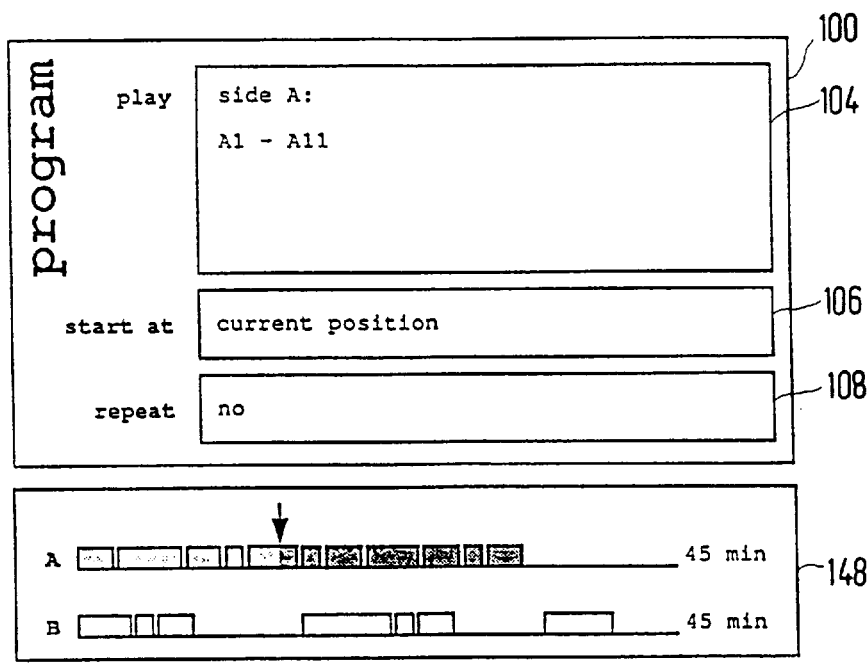

FIG. 6 is a further PROGRAM layout. In the length-proportional linear bar display 148 for both sides, the tracks sequence show activity levels and current position of pick-up head. In the Figure, the bar has been shown inside separate block 148. Of course, the configuration of this block as such, is a question of discretion. With respect to FIGS. 1, 3, the color assignment is different: now, light grey is past, dark grey is future, white is non-selected. In addition to actual pick-up element position shown by a dark cursor arrow, there is a lighter grey cursor arrow actually showing the intended beginning of play. Upon actuating the —GO— button 62, the pick-up element will move to the intended start position, and in so doing, the "present" cursor is moved to the intended cursor position. Upon arrival the two cursors will merge. In principle, more than two cursors could be feasible, the third one, for example, indicating the end of intended play.

Figure 7:
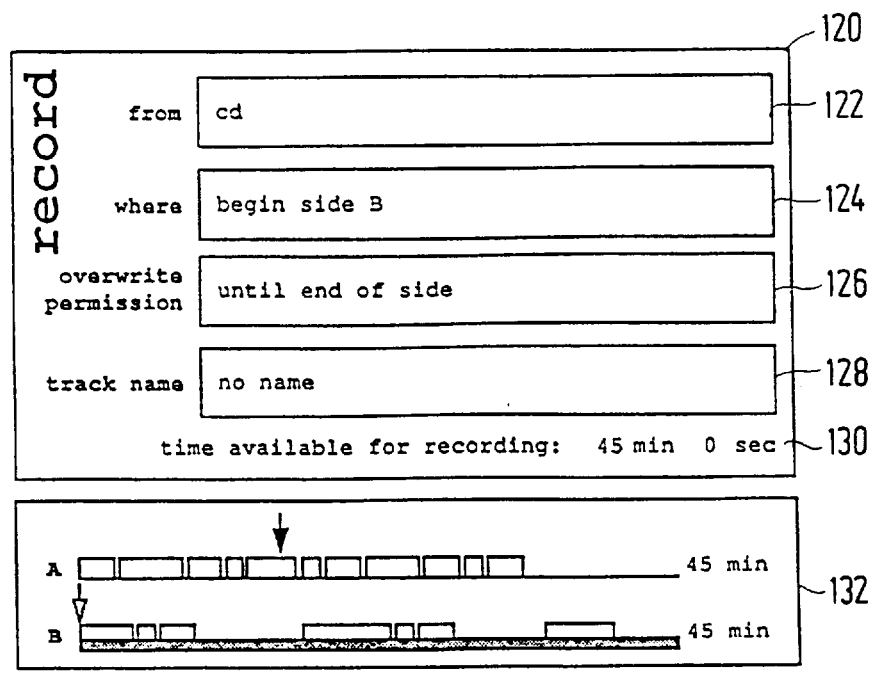
FIG. 7 is a RECORD layout.

FIG. 7 is a RECORD layout that has four blocks 122–128 and text-line 130 within main block 120. The length-proportional bar display is in block 132. Highlighting has not been shown and, in the Figure, all blocks 122–128 are at highest level. Block 122 shows the audio source that may be compact disc, radio, record player, microphone, auxiliary. Second block 124 shows where to record, that may be "after==last track", side A or (B), begin side A(B), "begin current track", "after current track", "begin selected track", "end selected track". In the latter two cases, at the next lower level, cycling may be effected through all tracks on either side A, B. Third block 126 shows overwrite permission that may be until end of side, until begin of next track, or until begin of selected track. In the latter case, at the next lower level the system may cycle along all tracks. The fourth block 128 may show track name. Track may have no name or a name as specifiable by the table of contents. The substance of the name could be the composer, the title of item or song, principal performer, or other. Finally, text line 130 shows the time actually available for recording: 45 minutes 0 secs. During the specifying of the items of blocks 124, 126, the time content of this line is updated when necessary. During actual recording, the time content of this line is real-time updated, together with actual running of the medium.

Length-proportional bar display 132 again shows the various tracks, together with current position of the pick-up element as a dark arrow, and the intended starting point of the recording as a lighter arrow. Display of tracks is now as a single color, as far as they have actually been recorded. Furthermore, a separate band at the lower edge of side B indicates the region where recording is to take place. If the user wants to know the content of what is to be overwritten, a changeover to the information display of FIG. 3 should be made.

Figure 8:
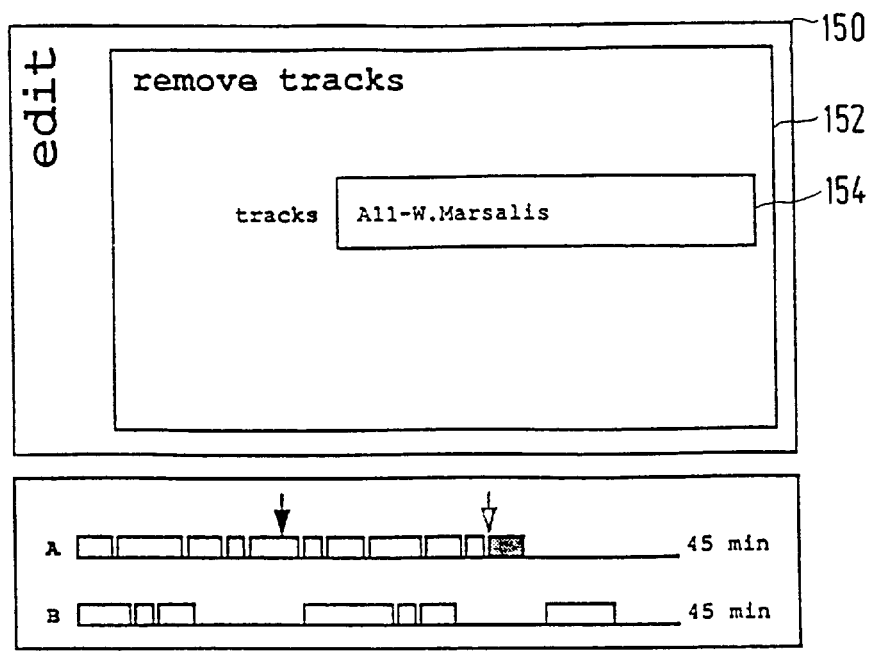
FIGS. 8–12 are EDIT layouts.

FIGS. 8–12 show EDIT mode, which is divided into submodes, that can be cycled through rotary button 50. FIG. 8 shows the "remove-tracks" submode. Overall block 150 contains submode blocks 152. On the next lower level block 154 shows the track or tracks that may be removed. Pressing GO button 62 would execute the removing. The selections are, for example, all tracks side A+B, all tracks side A, ditto B, current track, particular selected track. In the latter case, default is at first track side A; when the system goes one level deeper, this track is actually shown by number and name. Thereafter, rotary button 50 will successively cycle through all respective tracks. In this case, the target cursor (lighter) in block 160 indicates the beginning of what is to be removed, whereas the part to be removed is shown in a different colour (grey) from the tracks not to be removed; therefore, the grey arrow points at a notional pick-up element position that need not become an actual one.

Figure 9:
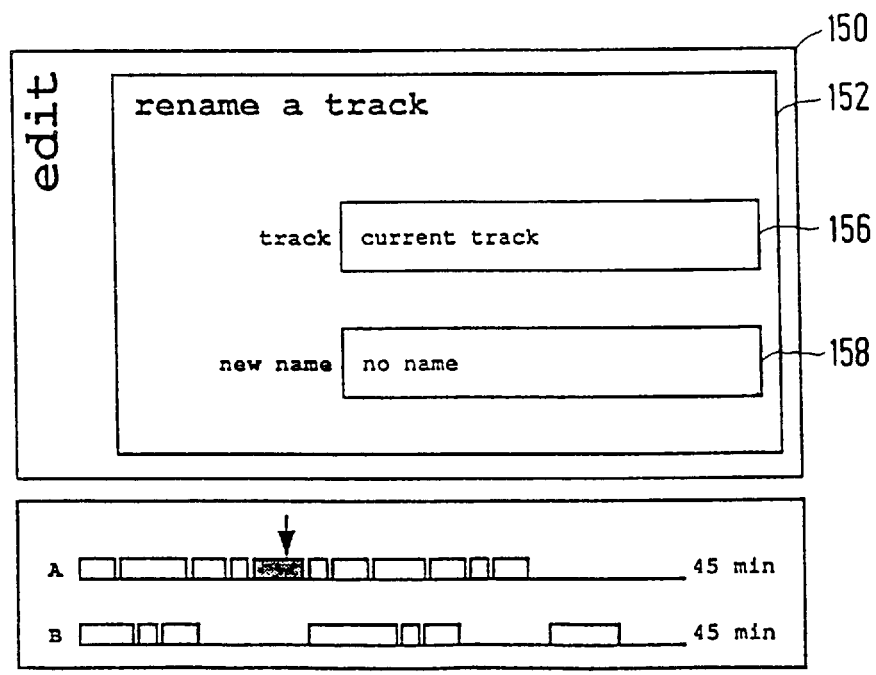

FIG. 9 shows the "rename a track" submode. Selecting submode is by button 50. One level deeper allows the user to step between blocks 156 and 158 by cursoring. Highlighting block 156 allows the user to specify a track. Cycling may be through current track/selectable track, so that at next lower level the names are cycled, or the cycling may be at the level shown. Highlighting block 158 allows the user to specify the current track. A separate possibility is to compose a name, which must be done at a next lower level. Cursoring is then through character positions in sequence, whereas character selection is by cycling with button 50.

Figure 10:
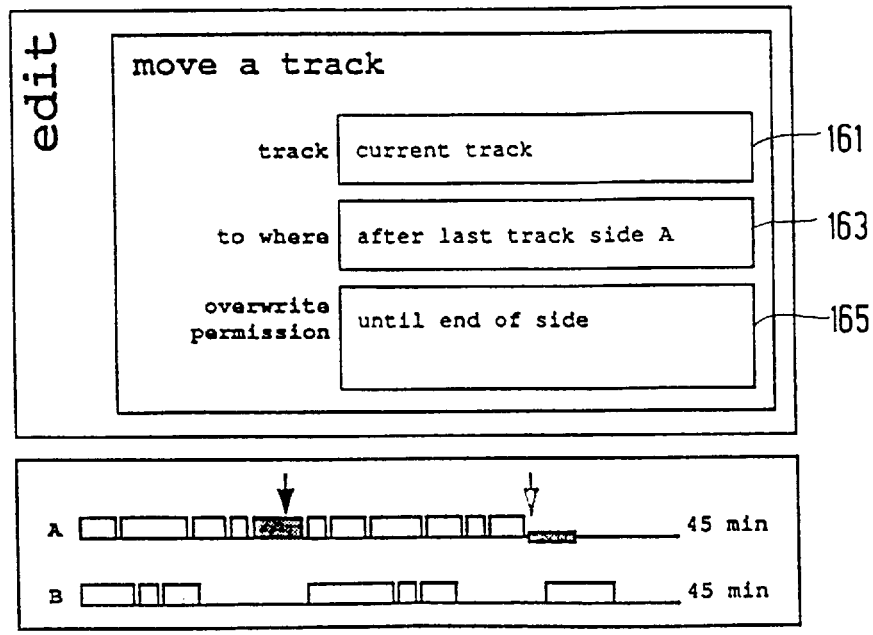

FIG. 10 shows the "move track" submode. This has the origin track (161) shown in the same way as "remove track".

The destination position (163, 165) is handled as shown in the same way as the record function described earlier.

Figure 11:
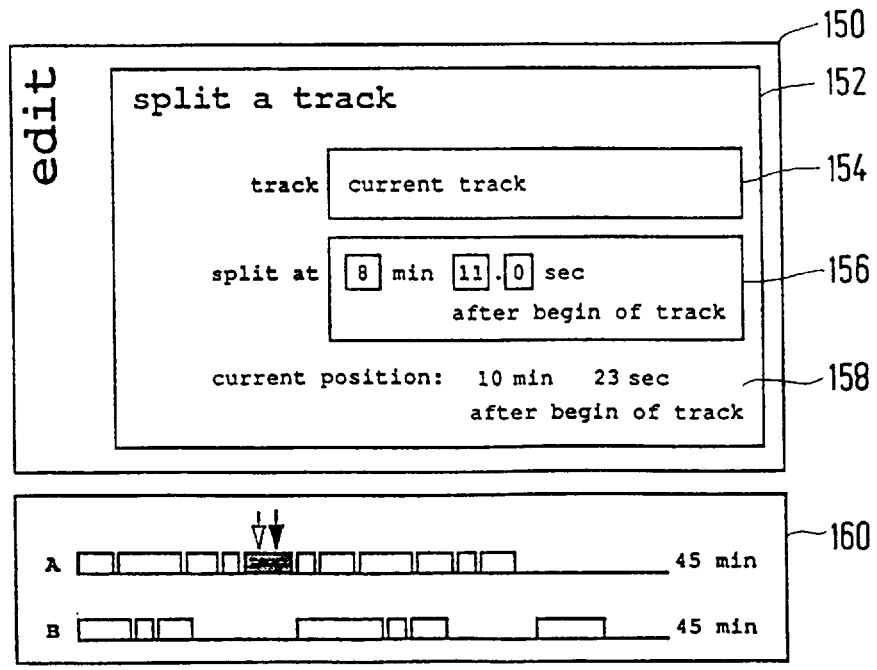

FIG. 11 shows the "split a track submode". Track selection (154) is as in "rename track", but now, in the next block 156, the splitting position is to be specified, either at the current position, or in three successive cursor positions cycling through minutes, seconds, tenths of seconds after begin of (current) track (block 156). The changing of the respective time values is done by rotary control element 50. As shown, during the split function, also the current position of the pick-up element is shown by the dark cursor whereas the splitting position is indicated by the lighter cursor arrow.

Figure 12:
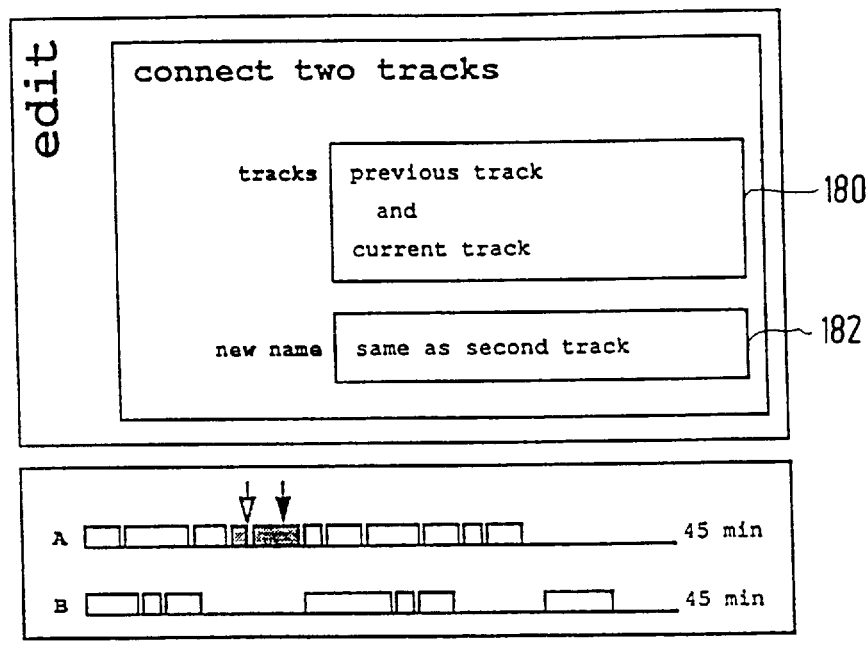

FIG. 12 shows the connect two tracks submode. This is selectable (180) on current track and next track, or on previous track and current track. Also, in block 182, the name of the connected tracks can be chosen as "same as first track", "same as second track", or "no name". In the first two cases, on the next lower level cycling through the respective names of the track in question can be effected through actuating rotary control element 50. In the connect function, text display 158 is not used. The current track and position are indicated by the darker cursor. The lighter cursor indicates the beginning of the track that is to be connected to the current track. For the connect operation, there is a maximum allowed spacing between the tracks to be connected. If the spacing is too large, an error message is displayed and the connecting is only effectible if the two tracks are moved towards each other.

Likewise, various other error situations when occurring, are signalled to a user. In certain situations, operating GO-button 62 will elicit a particular illustrating feedback noise or sound.

We claim:

1. A consumer apparatus for reading a removable information carrier having a linear sequence of information elements and for reproducing said sequence of information elements, said apparatus having interface means for interfacing to said information carrier, read means for, through said interface means, reading said information elements inclusive of content information indicating respective sub-sequences of said information elements each as an information item, and first visual display means for indicating respective activity levels of said information elements along said sequence, characterized in that said first visual display means has bar display means for displaying said sequence as a bar, and sub-bar display means for displaying within said bar said sub-sequences each as an identifiable and discrete sub-bar having at least a particular minimum length, but otherwise, a length which is proportional to a length of the represented sub-sequence, said bar display means further including visible separation indications between each of the sub-bar display means.

2. A consumer apparatus as claimed in claim 1, wherein said first visual display means allow for displaying discriminatory information between at least a first user functionality state and a second user functionality state on the level of a complete information item.

3. A consumer apparatus as claimed in claim 2, wherein said first visual display means allow for displaying at least three different user functionality states simultaneously.

4. A consumer apparatus as claimed in claim 2, wherein said first visual display means allow for discriminatorily displaying, at a notional and functionality assisting pick-up element's position, an associated information item as differing from neighboring ones of said information items.

5. A consumer apparatus as claimed in claim 1, wherein said first visual display means allow for displaying discriminatory information between at least a first user functionality state and a second user functionality state both within one single such information item.

6. A consumer apparatus as claimed in claim 1, wherein first visual said display means allow for perceptually steady displaying of discriminatory information regarding said item's user functionality state.

7. A consumer apparatus as claimed in claim 1, wherein an actual pick-up position along said information carrier controls a change-over between a "past" state and a "future" state displayed by said first visual display means.

8. A consumer apparatus as claimed in claim 7, wherein any of said pick-up element positions is cursored by a uniquely identifiable cursor.

9. A consumer apparatus as claimed in claim 1, wherein an intended pick-up position along said information carrier controls a changeover between a "past" state and a "future" state displayed by said first visual display means.

10. A consumer apparatus as claimed claim 1, and having recording functionality.

11. A consumer apparatus as claimed in claim 10, wherein said first visual display means allows for supplementing alongside and temporally conforming with said sub-bar display means, a second sub-bar display means indicating an intended recording functionality.

12. A consumer apparatus as claimed in claim 1, wherein any of said first visual display means, said bar display means, and said sub-bar display means is monochromatic.

13. A consumer apparatus as claimed in claim 1, wherein said removable information carrier is a tape medium.

14. A consumer apparatus as claimed in claim 1, wherein said removable information carrier is a disk medium.

15. A consumer apparatus as claimed in claim 1, and having second visual display means fore in each of a plurality of apparatus modes, displaying a plurality of function assisting indications in a form showing messages as being co-controlled with said first visual display means with respect to respective item functionality states and/or positions along said information carrier.

* * * * *